Sept. 25, 1928.
C. W. FREDERICK
1,685,600
OPTICAL SYSTEM FOR COLOR PROCESSES
Filed July 20, 1927   2 Sheets-Sheet 1
FIG_1_
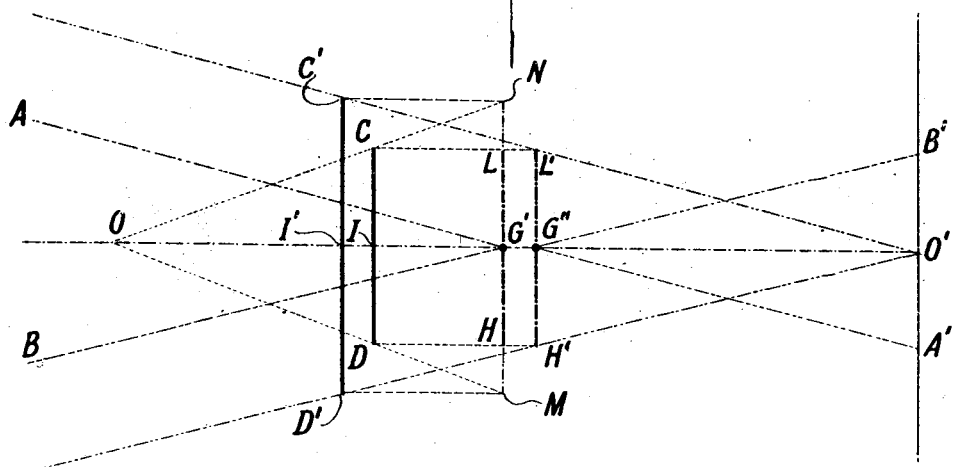
FIG_2_
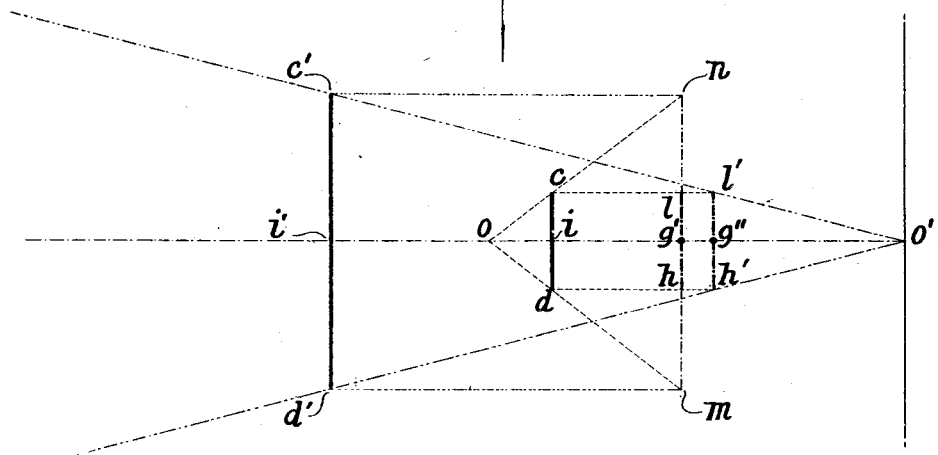
INVENTOR,
Charles W. Frederick,
BY
ATTORNEYS.

Sept. 25, 1928.
C. W. FREDERICK
1,685,600
OPTICAL SYSTEM FOR COLOR PROCESSES
Filed July 20, 1927     2 Sheets-Sheet 2
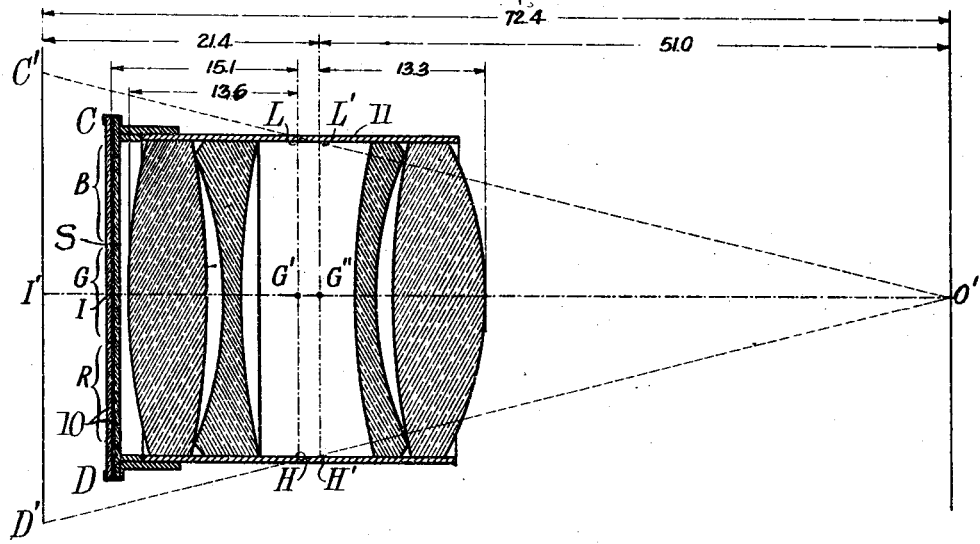
FIG_3_
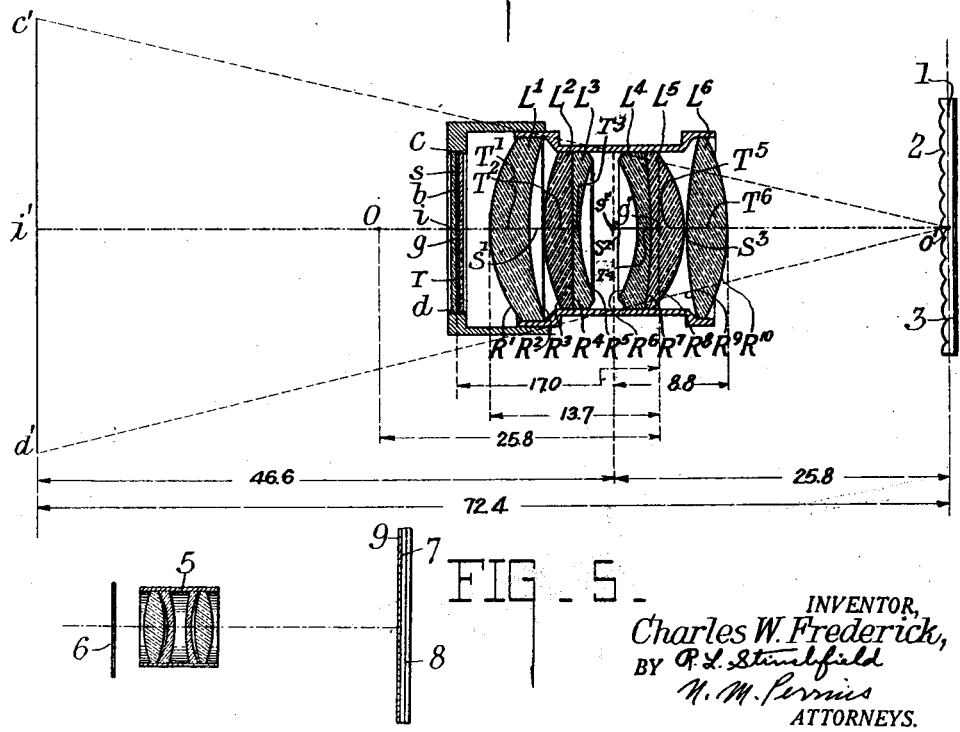
FIG_4_
FIG_5_
INVENTOR,
Charles W. Frederick,
BY
ATTORNEYS.

Patented Sept. 25, 1928.

1,685,600

UNITED STATES PATENT OFFICE.

CHARLES W. FREDERICK, OF ROCHESTER, NEW YORK, ASSIGNOR TO EASTMAN KODAK COMPANY, OF ROCHESTER, NEW YORK, A CORPORATION OF NEW YORK.

OPTICAL SYSTEM FOR COLOR PROCESSES.

Application filed July 20, 1927. Serial No. 207,213.

This invention relates to photographic color processes and more particularly to a process disclosed in the patent to Berthon, No. 992,151, granted May 16, 1911, in which a filter with color bands is placed at the objective and the exposure is made on a sensitive emulsion on the rear side of a support having minute lens elements upon its front surface. As there described, the same optical system is used for taking and projecting and the color screen is placed at the "optical center" of the objective.

When different optical systems are used, various expedients are used to compensate for the different focal lengths of the taking and projecting objectives. As is pointed out in French patent to Societe Du Film K. D. B. 573,508, delivered March 12, 1924 it is a requirement of the method that the filter as viewed from any individual minute lens element shall subtend the same angle, that is, shall appear the same, both in taking and projecting.

Practical considerations render it in general desirable that objectives of different focal lengths be used; and particularly that objectives of considerably greater focal length be used in projecting motion pictures than in taking them. It is further desirable that the same apparatus be used, with as slight adjustment as possible, both for ordinary black and white work and for color work. It is, therefore, desirable that few attachments, such as filters or accessory lenses, be used and that such as are necessary be placed directly in front of the objectives already used without requiring other adjustment of the apparatus.

I find that this can be accomplished in the following way. Knowing the projector system to be used, and the size of the apparent image of the color screen as viewed from the lenticulated surface, the filter is so placed on the taking lens and at such a distance in front of the front Gauss point that its apparent image as viewed from the focal plane will appear the same as the filter to be used in the projecting system, thereby fulfilling the condition laid down in the French patent mentioned, but at the same time locating the filters at points removed from the Gauss points and in front of the respective objectives, and also avoiding the use of supplementary or collimating lenses.

As will be pointed out later, there are further practical advantages in using as the taking objective one in which the front Gauss point is well back from the front surface.

Objects and advantages other than those above recited will appear from the following specification wherein reference is made to the accompanying drawings in the several figures of which the same reference characters indicate the same elements or points, and in which:

Figs. 1 and 2 are diagrams used to explain optical principles involving my invention;

Fig. 3 is a diagrammatic section of a projection system used in carrying out my invention;

Fig. 4 is a diagrammatic section of a preferred form of camera objective system used in carrying out my invention.

Fig. 5 is a diagram illustrating the use of a line screen instead of a lenticulated surface.

In order to explain the theory of my invention in a simple way, certain well known optical principles will be first reviewed. A lens, lens system or objective has two Gauss points, and in the formation of images, a ray directed to one of the Gauss points emerges from the system in a parallel direction in line with the other Gauss point. Thus in a system having the Gauss points $G'$ and $G''$, any ray $AG'$ emerges as $G''A'$ and $BG'$ as $G''B'$. The equivalent focal length $F$ of the system, of which $O$ and $O'$ are the front and rear focal points, is $OG'$ which is equal to $G''O'$. If the objective has a diaphragm opening $HL$ at $G'$ having a value such as $F/2$, this will appear from any point in the focal plane $A'O'B'$ to be at $G''$ and at the axis will subtend the angle $H'O'L'$. An object placed at $G'$ will appear to be at $G''$. If moved from $G'$ to the left, the virtual image of such an object will appear in a plane determined by the formula $\frac{1}{f'} + \frac{1}{f''} = \frac{1}{F}$, where $f'$ is the distance from the object to $G'$ and $f''$ the distance from the virtual image to $G''$. If the object occupy the plane $CID$, where $IG'$ is less than half the focal length $F$ the virtual image will appear to occupy the plane $C'I'D'$, between $O$ and $I$. When $I$ is very close to $G'$, $I'$ is at a slightly greater distance from $G''$, and as $I$ moves away from $G'$, $I'$ moves away more rapidly until when $G'I$ is about equal to one-half F, I' will be at O; as I then moves to O, I' moves from O to infinity at the left and becomes indeterminate. When I is to the left of O, the corresponding image becomes a real image to the right of the objective.

If an object at CID be of the same size as the diaphragm opening, the position and size of its virtual image may be determined geometrically by extending the lines OC and OD to their points of intersection N and M with the line through G' perpendicular to the axis, and drawing lines parallel to the axis through N and M to their points of intersection C' and D' with the lines O'L' and O'H' extended. In other words, the virtual image C'D' of an object DC, of the same size as the diaphragm opening at the first Gauss point, will subtend at the focal plane the same angle as the apparent diaphragm at the second Gauss point which it will appear to fill.

The above is rather elementary optics and is here re-stated so as to render simpler and more readily understandable the application of these principles by my invention to the color processes mentioned.

If Fig. 1 be considered a diagram illustrative of the optical points of a projection lens, and a three color screen of the type used in the said Berthon process be placed at CD, its virutal image will then appear from any point on the focal plane to be at C'D'. If this screen is of the size of the diaphragm its image will fill the diaphragm.

Knowing the projection objective to be used and the location and the size of the virtual image of the color screen, it is possible to determine for a camera objective of different focal length a position for a screen such that its virtual image will be of the same size and location.

In the present instance, assume a camera objective having a focal length one-half that of the projection objective. In Fig. 2, drawn to the same scale as Fig. 1, are indicated at $g'$ and $g''$ the Gauss points of an objective having a focal length $f$ equal to $og'$ or $o'g''$. The diaphragm is indicated at $lh$, and has the same relative aperture as that of the projection objective, and its virtual image will be at $l'h'$.

The required position and size of the virtual image $c'd'$ of the screen being the same as that of C'D' of Fig. 1 is known; that is $i'o' = I'O'$ and $c'd' = C'D'$. The position at which a screen $cd$, equal in size to $lh$, must be placed to produce this virtual image can be computed, or determined geometrically, by the method mentioned above, by drawing $c'n$ and $d'm$ parallel to the axis to a line through $g'$ and $c$ and $d$ being then the intersections of $on$ and $om$ with lines through $h$ and $l$ parallel to the axis.

It will be noted that the screen will be over half the distance from $g'$ to $o$ and its virtual image beyond $o$.

If, therefore, photographs are taken by an objective having the constants of Fig. 2, they may be projected through the system of Fig. 1, and as the virtual image of the color screen is in each case the same, as viewed from the image plane, the requirements of the color process are satisfied in this respect. This discussion, it is to be noted, is general and is applicable to any types of lenses or lens systems.

In practice, I have found that, while almost any of the usual projection objectives may be employed such, for instance, as those of the well known Petzval type, or the objective disclosed in the patent of Altman and myself, No. 1,620,337, granted March 8, 1927, certain known types of photographic objectives are better adapted for the camera than others; and in particular, I find desirable an objective having a considerable thickness from front surface to rear surface and having its front Gauss point $g'$ well back of its front surface so that the corresponding front focal point $o$ is relatively close to its front surface.

For practical reasons it is desirable that the color screen be close to the actual front surface of the objective in both taking and projecting. This is because the front edge of the lens mount acts as a vignette. If it be placed at $cd$, its image will appear at $c'd'$. If, however, it is to the right of $cd$, its virtual image will be to the right of $c'd'$ and will cut down the extent to which the virtual image of the screen is visible from an angle at the focal plane. The nearer the screen comes to coincidence with this front lens surface or its mount, the less will its image be cut off when viewed from the edges of the exposure field, and the better will be the resultant color rendering. This can be, in part, obviated by making the outer lenses larger than the diaphragm.

Since the projection objective is used as the basis, the filter or screen is mounted as closely as possible in front of it, and the position of the virtual image ascertained. As just described, the location of the filter with a taking objective of given focal length is then determined. To obtain the best results, there should then be selected a taking objective in which the front surface is located just within the ascertained screen location, that is, an objective having the front Gauss point well back within the objective.

By way of illustration, examples of objectives used in taking and projection will now be given, but it is to be understood that my invention is by no means limited to the objectives here shown nor do I herein claim the formulæ given.

A known projection lens now on the market and constructed in accordance with the patent to Altman and myself, No. 1,620,337, March 8, 1927, will be taken. This objective is supplied with a focal length of 51 mm. and an aperture of F/2. Its front and rear Gauss points are located inwardly from the front and rear surfaces 13.6 and 13.3 mm. respectively. When the diaphragm is fully open, the mount may be considered as of uniform diameter as shown. There is, therefore, in the plane of G′ an opening LH appearing to be at L′H′. A screen S having three color sections R, G and B is mounted as near as practicable to the front surface. This may be at a distance 15.1 mm. in front of the front Gauss point, at the plane CID. This screen has the same effective diameter as the diaphragm of the mount. Its virtual image C′I′D′ is then found to be in front of the rear Gauss point G″ by a distance of 21.4 mm. and to be distant 72.4 mm. from the focal plane. These points and dimensions are shown in Fig. 3, the points being given the same reference characters as in Fig. 1. The screen S in practice has sheet gelatine elements mounted between plane glass plates 10.

The objective chosen for the taking camera is illustrated in Fig. 4. This is a modification of a known type of objective; the actual formula used being as follows:

| Lens | Radii | Thickness and separation | Glass D line | $\nu$ |
|---|---|---|---|---|
| L¹ | R₁ =15.80 | T¹=2.68 | 1.61088 | 57.2 |
|    | R₂ =94.82 | S¹= .39 |         |      |
| L² | R₃ =11.24 | T²=3.39 | 1.61088 | 57.2 |
| L³ | R₄ =plane | T³= .50 | 1.60470 | 38.2 |
|    | R₅ = 7.12 | S²=4.69 |         |      |
| L⁴ | R₆ = 6.81 | T⁴= .50 | 1.60470 | 38.2 |
|    | R₇ =plane | T⁵=3.39 | 1.61088 | 57.2 |
| L⁵ | R₈ = 8.84 | S³= .72 |         |      |
| L⁶ | R₉ =10.86 | T⁶=2.68 | 1.61088 | 57.2 |
|    | R₁₀=20.46 |         |         |      |

In the above table L¹ to L⁶ designate the successive lens elements from front to back, R₁ to R₁₀ the radii of curvature for the successive surfaces, T¹ to T⁶ the thicknesses and S¹ to S³ the separations. The index of refraction for the D line and the dispersive ratio $\nu$ are also given. For the four positive lenses barium crown glass is used; and for the two negatives, dense flint.

This objective has a focal length of 25.8 mm. and is used at a relative aperture of F/2. Its front Gauss point is 13.7 mm. behind the front surface, and its rear Gauss point is 8.8 mm. in front of its rear surface. It is to be noted that the front Gauss point is, therefore, actually in back of the rear Gauss point.

Since the desired position of the virtual image of a screen is known to be 72.4 mm. in front of the focal plane, the required position of the actual screen is readily determined and is found to be 17 mm. in front of G′, or 3.3 mm. in front of the front surface. In practice, this is carried in a cap adapted to be slipped on the front of a mount and positioned accurately at the desired position, as, for instance, by the structure shown in a copending application of Otto Wittel, Serial No. 189,131, filed May 5, 1927.

As has been stated, the theory outlined is general in its application but when the taking lens has a focal length materially shorter than the projection lens, a camera objective having the characteristics of the above example is particularly useful. The front Gauss point is so far behind the front surface, that the latter is brought relatively close to the front focal point, making it possible to position the color screen nearer to the front focal point than to the front Gauss point and, at the same time, so close to the front surface that it is not greatly vignetted thereby. This characteristic is most easily attained in a properly designed objective of considerable thickness from front to rear, and the front Gauss point is found to be well behind the central point of the objective, being in this case well behind the rear Gauss point also.

It is to be noted that the two objectives have the same relative aperture and since, in each case, the effective diameter of the color screen is the same as that of the diaphragm, their relative diameters have the same ratio as the focal lengths of the objectives with which they are used.

In the color process described there is preferably used a support 1 having on the surface facing the objective lenticular elements 2 and having a sensitive emulsion 3 on the rear surface. These are shown on an enlarged scale in Fig. 4 only. This element should be so located that the Gauss points of the individual lensiets 2 will lie in the focal plane of the objective, that is with film .15 mm. thick and having 22 lenses to a millimetre, the Gauss points will lie in the neighborhood of the central plane of the film.

It is to be noted that my invention is applicable to systems of widely different types, focal length and aperture and is, in fact, general in its application.

The system with which it is used may be of the type using a line screen or a screen having minute apertures in place of lenses, such a system being shown in Fig. 5, where 5 is the objective, 6 the screen, 7 a transparent support with an emulsion 8, and 9 a very finely perforated opaque screen separated from the emulsion and here shown as in contact with the front surface of the support 7.

It is obvious that the invention is applicable to a wide range of structures and I consider as included in my invention all such modifications and equivalents as fall within the scope of the appended claims.

Having thus described my invention, what I claim as new and desire to secure by Letters Patent is:

1. A photographic optical system for use in the formation, in a photographic layer having associated therewith numerous microscopic image-forming elements, of minute photographic images for projection through a projection system comprising a projection objective and a polychromatic screen, the virtual image of which occupies an ascertained position with respect to the rear focal plane of such objective, said photographic optical system comprising a photographic objective of different focal length from the projection objective, and a polychromatic screen similar to the first-named screen and positioned in front of the photographic objective at that point which is conjugate to a point distant from the rear focal plane of the objective by the distance which the said virtual image in the projection system is distant from the rear focal plane of the projection objective.

2. A photographic optical system for use in the formation, in a photographic layer having associated therewith numerous microscopic image-forming elements, of minute photographic images for projection through a projection system comprising a projection objective and a polychromatic screen, the virtual image of which occupies an ascertained position with respect to the rear focal plane of such objective, said photographic optical system comprising a photographic objective of different focal length from the projection objective, and a polychromatic screen similar to the first-named screen and positioned in front of the photographic objective at that point which is conjugate to a point distant from the rear focal plane of the objective by the distance which the said virtual image in the projection system is distant from the rear focal plane of the projection objective, the effective diameter of the second mentioned screen having the same ratio to the first mentioned screen that the focal length of the photographic objective has to that of the projection objective, whereby the virtual image in the photographic system has the same size and relative position as that in the projection system.

3. A photographic optical system for use in the formation, in a photographic layer having associated therewith numerous microscopic image-forming elements, of minute photographic images for projection through a projection system comprising a projection objective of ascertained focal length and a polychromatic screen situated in front of said objective, the virtual image of the screen occupying an ascertained position with respect to the rear focal plane of such objective, said photographic optical system comprising a photographic objective having a focal length less than that of the projection objective but of the same relative aperture and a polychromatic screen similar to the first-named screen and positioned in front of the photographic objective at that point which is conjugate to a point distant from the rear focal plane of the objective by the same distance as the first mentioned screen is distant from the rear focal plane of the projection objective.

4. A photographic optical system for use in the formation, in a photographic layer having associated therewith numerous microscopic image-forming elements, of minute photographic images for projection through a projection system comprising a projection objective of ascertained focal length and a polychromatic screen situated in front of said objective, the virtual image of the screen occupying an ascertained position with respect to the rear focal plane of such objective, said photographic optical system comprising a photographic objective having a focal length less than that of the projection objective but of the same relative aperture and a polychromatic screen similar to the first-named screen and positioned in front of the photographic objective at that point which is conjugate to a point distant from the rear focal plane of the objective by the same distance as the first mentioned screen is distant from the rear focal plane of the projection objective, the effective diameter of the second mentioned screen bearing the same ratio to that of the first mentioned screen that the focal length of the photographic objective bears to that of the projection objective, whereby the virtual image in the photographic system has the same size and relative position as that in the projection system.

5. A photographic optical system for use in the formation, in a photographic layer having associated therewith numerous microscopic image-forming elements, of minute photographic images for projection through a projection system comprising a projection objective of ascertained focal length and a polychromatic screen situated in front of said objective, the virtual image of the screen occupying an ascertained position with respect to the rear focal plane of such objective, said photographic optical system comprising a photographic objective having a focal length less than that of the projection objective but of the same relative aperture and a polychromatic screen similar to the first-named screen and positioned in front of the photographic objective at that point which is conjugate to a point distant from the rear focal plane of the objective by the same distance as the first mentioned screen is distant from the rear focal plane of the projection objective, the front Gauss point of the photographic objective being behind the front surface by a distance exceeding half the length of the objective, and the screen being nearer to the front focal point than to the front Gauss point.

6. A photographic optical system for use in the formation, in a photographic layer having associated therewith numerous microscopic image-forming elements, of minute photographic images for projection through a projection system comprising a projection objective of ascertained focal length and a polychromatic screen situated in front of said objective, the virtual image of the screen occupying an ascertained position with respect to the rear focal plane of such objective, said photographic optical system comprising a photographic objective having a focal length less than that of the projection objective but of the same relative aperture and a polychromatic screen similar to the first-named screen and positioned in front of the photographic objective at that point which is conjugate to a point distant from the rear focal plane of the objective by the same distance as the first mentioned screen is distant from the rear focal plane of the projection objective, the front surface of the photographic objective being closer to the front focal point than to the front Gauss point and the screen being situated between the front surface and the front focal point.

7. A photographic optical system for use in the formation, in a photographic layer having associated therewith numerous microscopic image-forming elements, of minute photographic images for projection through a projection system comprising a projection objective of ascertained focal length and a polychromatic screen situated in front of said objective, the virtual image of the screen occupying an ascertained position with respect to the rear focal plane of such objective, said photographic optical system comprising a photographic objective having a focal length less than that of the projection objective but of the same relative aperture and a polychromatic screen similar to the first-named screen and positioned in front of the photographic objective at that point which is conjugate to a point distant from the rear focal plane of the objective by the same distance as the first mentioned screen is distant from the rear focal plane of the projection objective, the effective diameter of the second mentioned screen bearing the same ratio to that of the first mentioned screen that the focal length of the photographic objective bears to that of the projection objective, and the front surface of the photographic objective being closer to the front focal point than to the front Gauss point and the screen being situated between the front surface and the front focal point.

8. A photographic optical system for use in a color photographic process for taking pictures on a photographic layer having associated therewith numerous microscopic image-forming elements and comprising an objective having its front Gauss point over half the actual length of the objective behind its front surface and a polychromatic screen positioned in front of the objective nearer to the front focal point than to the front Gauss point thereof.

9. A photographic optical system for use in a color photographic process for taking pictures on a photographic layer having associated therewith numerous microscopic image-forming elements and comprising an objective having an actual length exceeding half its focal length and having its front Gauss point over half its actual length behind its front surface and a polychromatic screen positioned in front of the objective nearer to the front focal point than to the front Gauss point thereof.

10. A photographic optical system for use in a color photographic process for taking pictures on a photographic layer having associated therewith numerous microscopic image forming elements and comprising an objective having its front Gauss point behind its rear Gauss point and having a polychromatic screen positioned in front of it and nearer to its front focal point than to its front Gauss point.

11. An optical system for use in a color photographic process for taking pictures on a photographic layer having associated therewith numerous microscopic image-forming elements and comprising an objective having its front surface nearer to its front focal point than to its front Gauss point, and a polychromatic screen positioned in front of it and behind its front focal point.

12. An optical system for use in a color photographic process for taking pictures on a photographic layer having associated therewith numerous microscopic image forming elements and comprising an objective having its front surface nearer to its front focal point than to its front Gauss point and a polychromatic screen positioned in front of it and behind its front focal point, whereby a virtual image of said screen is formed in front of the front focal point, the exact position of said screen being determined in accordance with the constants of a projection system by which pictures made by the objective are to be projected and being such that the said virtual image will be of the same size and position as the virtual image of a corresponding screen in the projection system.

13. Complementary optical systems for use respectively in the taking and projecting of color photographs by the use of photographic layers having associated therewith numerous microscopic image-forming elements and comprising two objectives of different focal length and two similar polychromatic screens, one screen being mounted in front of each objective, the positions of said screens being such that the virtual images of the screens are of the same size and have the same positions relative to the rear focal planes of said objectives respectively.

14. Complementary optical systems for use respectively in the taking and projecting of color pictures by the use of the same photographic layer having associated therewith numerous microscopic image-forming elements and comprising two objectives of different focal lengths but of the same relative aperture and two similar polychromatic screens, one screen being mounted in front of each objective, the positions of said screens being such that the virtual images thereof are of the same size and have the same positions relative to the rear focal planes of said objectives, the relative sizes of the two screens being the same as the relative focal lengths of the two objectives with which they are respectively associated.

15. Complementary optical systems for use respectively in the taking and projecting of color photographs by the use of the same photographic layer having associated therewith numerous microscopic image-forming elements and comprising, as a taking system, an objective having its front surface closer to the front focal point than to the front Gauss point and a polychromatic screen mounted between the front surface and the front focal point whereby there is formed in front of the front focal point a virtual image of the said screen having a definite size and position relative to the rear focal plane of the said objective and further comprising, as a projecting system, an objective of greater focal length than the first mentioned objective and a polychromatic screen similar to the first mentioned screen and positioned in front of said objective at a position such that its virtual image has the same size and position relative to the rear focal plane of the objective as the first mentioned virtual image has to the corresponding focal plane of the first system.

16. Complementary optical systems for use respectively in the taking and projecting of color photographs by the use of the same photographic layer having associated therewith numerous microscopic image-forming elements and comprising, as a taking system, an objective having its front surface closer to the front focal point than to the front Gauss point and a polychromatic screen mounted between the front surface and the front focal point whereby there is formed in front of the front focal point a virtual image of the said screen having a definite size and position relative to the rear focal plane of the said objective and further comprising, as a projecting system, an objective of greater focal length than the first mentioned objective and a polychromatic screen similar to the first mentioned screen and positioned in the front of said objective, in front of the front surface of the objective and behind the front focal point by a distance greater than one half the focal length of the objective at a point such that its virtual image is positioned behind the front focal point and has the same size and position relative to the rear focal plane of the objective as the first mentioned virtual image has to the corresponding focal plane of the first system.

17. In a color process involving the use of a photographic layer having microscopic image-forming elements associated therewith, the steps of forming in such a layer an image by means of an objective having in front thereof a polychromatic screen the virtual image of which has a definite size and position with respect to the layer, and projecting the image resulting in such layer from such exposure through an objective of a different focal length having in front thereof a similar screen at such a position that the virtual image thereof has the same definite size and position with respect to the layer as the first mentioned screen had.

Signed at Rochester, New York, this 16th day of July, 1927.

CHARLES W. FREDERICK.